United States Patent
Sharma et al.

(10) Patent No.: US 12,224,953 B2
(45) Date of Patent: *Feb. 11, 2025

(54) WIDE ELASTIC BUFFER

(71) Applicant: Achronix Semiconductor Corporation, Santa Clara, CA (US)

(72) Inventors: Naresh Sharma, Uttar Pradesh (IN); Mohan Vedam, Karantaka (IN)

(73) Assignee: Achronix Semiconductor Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/128,901

(22) Filed: Mar. 30, 2023

(65) Prior Publication Data

US 2023/0239256 A1  Jul. 27, 2023

Related U.S. Application Data

(63) Continuation of application No. 16/877,695, filed on May 19, 2020, now Pat. No. 11,689,478.

(51) Int. Cl.
*H04L 49/90* (2022.01)
*H04J 3/06* (2006.01)
*H04L 49/9047* (2022.01)

(52) U.S. Cl.
CPC ........ *H04L 49/9052* (2013.01); *H04J 3/0632* (2013.01); *G06F 2213/0026* (2013.01)

(58) Field of Classification Search
CPC ................ H04L 49/9052; H04J 3/0632; G06F 2213/0026
See application file for complete search history.

(56) References Cited

U.S. PATENT DOCUMENTS 7,093,061 B2   8/2006   Teo
7,099,426 B1 *  8/2006   Cory ..................... G06F 5/10
                                                       375/372

(Continued)

FOREIGN PATENT DOCUMENTS

CN         1890627          1/2007
CN       109564508          4/2019

(Continued)

OTHER PUBLICATIONS

"U.S. Appl. No. 16/877,695, Examiner Interview Summary mailed Dec. 2, 2022", 2 pgs.

(Continued)

*Primary Examiner* — Henry Tsai
*Assistant Examiner* — Harry Z Wang
(74) *Attorney, Agent, or Firm* — Schwegman Lundberg & Woessner, P.A.

(57) ABSTRACT

A receiving device uses an elastic buffer that is wider than the number of data elements transferred in each cycle. To compensate for frequency differences between the transmitter and the receiver, the transmitting device periodically sends a skip request with a default number of skip data elements. If the elastic buffer is filling, the receiving device ignores one or more of the skip data elements. If the elastic buffer is emptying, the receiving device adds one or more skip data elements to the skip request. To maintain the ordering of data despite the manipulation of the skip data elements, two rows of the wide elastic buffer are read at a time. This allows construction of a one-row result from any combination of the data elements of the two rows. The column pointers are adjusted appropriately, to ensure that they continue to point to the next data to be read.

20 Claims, 6 Drawing Sheets

(56) References Cited

U.S. PATENT DOCUMENTS

| | | | |
|---|---|---|---|
| 7,751,517 | B2 | 7/2010 | Li et al. |
| 8,161,210 | B1* | 4/2012 | Norrie ............... H04L 25/14 710/33 |
| 8,611,173 | B1 | 12/2013 | Zhang |
| 9,880,949 | B1* | 1/2018 | Hanchinal ........... G06F 13/4068 |
| 2004/0228429 | A1* | 11/2004 | Schanke ............. H04L 25/14 375/372 |
| 2005/0188146 | A1 | 8/2005 | Teo |
| 2006/0075162 | A1* | 4/2006 | Shiraishi ............. G06F 5/14 710/52 |
| 2006/0230215 | A1 | 10/2006 | Woodral |
| 2007/0002991 | A1* | 1/2007 | Thompson ........... H04J 3/0632 375/372 |
| 2007/0177701 | A1 | 8/2007 | Thanigasalam |
| 2008/0141063 | A1 | 6/2008 | Ridgeway et al. |
| 2009/0086874 | A1* | 4/2009 | Wang ................. H04L 7/005 375/372 |
| 2010/0082910 | A1 | 4/2010 | Raikar et al. |
| 2011/0243211 | A1 | 10/2011 | Chacko et al. |
| 2011/0296073 | A1* | 12/2011 | Chuang .............. G06F 13/1684 710/310 |
| 2012/0290800 | A1 | 11/2012 | Krishnan et al. |
| 2012/0317380 | A1* | 12/2012 | Agrawal ............. G06F 5/10 711/159 |
| 2018/0004686 | A1* | 1/2018 | Chen ................. G06F 13/16 |
| 2021/0367908 | A1 | 11/2021 | Sharma et al. |

FOREIGN PATENT DOCUMENTS

| | | |
|---|---|---|
| CN | 115699668 A | 2/2023 |
| WO | WO-2021236420 A1 | 11/2021 |

OTHER PUBLICATIONS

"U.S. Appl. No. 16/877,695, Final Office Action mailed Jun. 28, 2022", 30 pgs.

"U.S. Appl. No. 16/877,695, Non Final Office Action mailed Feb. 7, 2022", 26 pgs.

"U.S. Appl. No. 16/877,695, Non Final Office Action mailed Oct. 7, 2022", 28 pgs.

"U.S. Appl. No. 16/877,695, Notice of Allowance mailed Feb. 14, 2023", 8 pgs.

"U.S. Appl. No. 16/877,695, Response filed Apr. 29, 2022 to Non Final Office Action mailed Feb. 7, 2022", 11 pgs.

"U.S. Appl. No. 16/877,695, Response filed Aug. 25, 2022 to Final Office Action mailed Jun. 28, 2022", 9 pgs.

"U.S. Appl. No. 16/877,695, Response filed Dec. 6, 2022 to Non Final Office Action mailed Oct. 7, 2022", 11 pgs.

"International Application Serial No. PCT/US2021/032223, International Preliminary Report on Patentability mailed Dec. 1, 2022", 6 pgs.

"International Application Serial No. PCT/US2021/032223, International Search Report mailed Aug. 20, 2021", 2 pgs.

"International Application Serial No. PCT/US2021/032223, Written Opinion mailed Aug. 20, 2021", 4 pgs.

"U.S. Appl. No. 16/877,695, Corrected Notice of Allowability mailed Apr. 6, 2023", 5 pgs.

"Chinese Application Serial No. 202180036619.6, Voluntary Amendment filed May 19, 2023", with English claims, 9 pgs.

"European Application Serial No. 21809644.4, Response filed Jun. 27, 2023 to Communication pursuant to Rules 161(1) and 162 EP mailed Jan. 3, 2023", 13 pgs.

"Chinese Application Serial No. 202180036619.6, Office Action mailed Oct. 21, 2023", w English Translation, 13 pgs.

"Chinese Application Serial No. 202180036619.6, Response filed Jan. 26, 2024 to Office Action mailed Oct. 21, 2023", with machine translation, 63 pgs.

"Chinese Application Serial No. 202180036619.6, Office Action mailed Mar. 22, 2024", w/ English translation, 11 pgs.

"Chinese Application Serial No. 202180036619.6, Response filed May 22, 2024 to Office Action mailed Mar. 22, 2024", w/ english claims, 10 pgs.

"European Application Serial No. 21809644.4, Extended European Search Report mailed May 7, 2024", 7 pgs.

* cited by examiner

310 REGISTER FILE CONTENTS

| | | | | |
|---|---|---|---|---|
| X | W | V | U(7) | |
| T | SK | COM | S | |
| R(6) | Q | P | O | |
| N(5) | M | L | SK | |
| COM | K(4) | J | I | |
| SK | COM | H(4) | G | |
| F | E | SK | COM (2) | |
| D | C | B | A(1) | |

320 LANE SHIFTER OUTPUT

| | | | | |
|---|---|---|---|---|
| 1 | D | C | B | A |
| 2 | G | F | E | COM |
| 4 | J | I | COM | H |
| 4 | M | L | COM | K |
| 5 | Q | P | O | N |
| 6 | T | COM | S | R |
| 7 | X | W | V | U |

330 READ POINTER MODIFICATIONS

| | | | | |
|---|---|---|---|---|
| 1 | + | + | + | + |
| 2 | + | + | + | ++ |
| 4 | + | + | ++ | + |
| 4 | + | ++ | + | + |
| 5 | + | + | + | + |
| 6 | ++ | + | + | + |
| 7 | + | + | + | + |

410 — REGISTER FILE CONTENTS

| | | | |
|---|---|---|---|
| X | W | V | U(9) |
| T | SK | COM(8) | S |
| R | Q | P(7) | O |
| N | M | L(6) | SK |
| COM | K(5) | J | I |
| SK(5) | COM | H | G |
| F(3) | E | SK | COM(2) |
| D | C | B | A(1) |

420 — LANE SHIFTER OUTPUT

| | D | C | B | A |
|---|---|---|---|---|
| 1 | D | C | B | A |
| 2 | E | SK | SK | COM |
| 3 | COM | H | G | F |
| 4 | J | I | SK | SK |
| 5 | SK | SK | COM | K |
| 6 | O | N | M | L |
| 7 | S | R | Q | P |
| 8 | T | SK | SK | COM |
| 9 | X | W | V | U |

430 — READ POINTER MODIFICATIONS

| | | | | |
|---|---|---|---|---|
| 1 | + | + | + | + |
| 2 | = | + | + | + |
| 3 | + | + | + | + |
| 4 | + | = | + | + |
| 5 | + | + | = | + |
| 6 | + | + | + | + |
| 7 | + | + | + | + |
| 8 | + | + | + | = |
| 9 | + | + | + | + |

WIDE ELASTIC BUFFER

BACKGROUND

Two devices communicate using a communication protocol. The two devices nominally operate at the same frequency, but use independent clock generation circuits. As a result, a small difference between the actual frequencies may result. Additionally, even if the frequencies were identical, the phases of the clocks are independent. As a result of these clock differences, buffering is used to allow data to cross from one clock domain to the other.

PCI express (PCIe) is a high-speed bi-directional serial connection. Currently there are five generations of PCIe, though more are planned. Each subsequent generation provides a higher data transfer than the previous generation and is backwards compatible, such that devices negotiate a common protocol using the first generation (GEN1) protocol before upgrading to a later generation. An elastic buffer (also referred to as a rate-matching first-in first-out (FIFO)) is used to cross the clock domain boundary at the receiver between the transmitter clock and the receiver clock.

Even though the PCIe devices are designed to operate at the same frequency, some variation will exist between the physical devices. For example, the PCIe GEN1 protocol allows for a tolerance of 300 parts per million (ppm). Other protocols have greater tolerances. For example, use of the Separate Reference Independent Clocking (SRIS) feature in PCIe increases the tolerance by 5000 ppm. However, any frequency difference (even within the tolerance) will eventually cause overflow, if the transmitting device is providing data faster than the receiving device is processing it, or underflow, if the transmitting device is not providing data as quickly as the receiving device is processing it. Special skip symbols are inserted periodically by the transmitter. When received, the receiver can add or remove skip symbols to prevent overflow or underflow of the elastic buffer.

BRIEF DESCRIPTION OF THE DRAWINGS

Some embodiments of the disclosed technology are illustrated by way of example and not limitation in the figures of the accompanying drawings.

FIG. 3 is an example showing register file contents, lane shifter output, and read pointer modifications for a wide elastic buffer.

FIG. 4 is an example showing register file contents, lane shifter output, and read pointer modifications for a wide elastic buffer.

DETAILED DESCRIPTION

Example methods, systems and circuits for maintaining a wide elastic buffer will now be described. In the following description, numerous examples having example-specific details are set forth to provide an understanding of example embodiments. It will be evident, however, to one of ordinary skill in the art that these examples may be practiced without these example-specific details, and/or with different combinations of the details than are given here. Thus, specific embodiments are given for the purpose of simplified explanation, and not limitation.

A receiving device uses an elastic buffer that is wider than the number of data elements transferred in each cycle. To fill the columns of the elastic buffer evenly, the write pointer refers to each column in turn. Thus, a first data element is written to a first column, a second data element is written to a second column, and so on until each column has received one data element, at which point the write pointer points to the next entry in the first column.

To compensate for frequency differences of the two devices, the transmitting device periodically sends a skip request with a default number of skip data elements. To compensate for the difference, the receiving device ignores one or more of the skip data elements, thus using the cycle of the skip request to process data even though the transmitting device did not send data that cycle.

Alternatively, if the receiving device is faster than the transmitting device, the elastic buffer will be emptying at a rate that depends on the difference in speed. To compensate for the difference, the receiving device adds one or more skip data elements to the skip request, thus processing even less data in the elastic buffer than indicated by the skip request.

However, if the read pointer of each column is simply adjusted to reflect the skipped data, the effect will be to change the order in which data is read from the elastic buffer unless the amount of skipped data is an even multiple of the width of the elastic buffer. For example, if the wide elastic buffer is four columns wide and three data elements are skipped, three read pointers would be incremented and the fourth would remain unchanged. As a result, the next read of four data elements would include data ordered in a way that depends on the alignment of the three data elements, not only on the order in which the elements are received.

To avoid this problem, two rows of the wide elastic buffer are read at a time. This allows construction of a one-row result from any combination of the data elements of the two rows. As a result, data may be reordered to provide correctly ordered data elements of the width of the elastic buffer, even when skips are added or deleted. The column pointers are adjusted appropriately, to ensure that they continue to point to the next data to be read.

Figure 1:
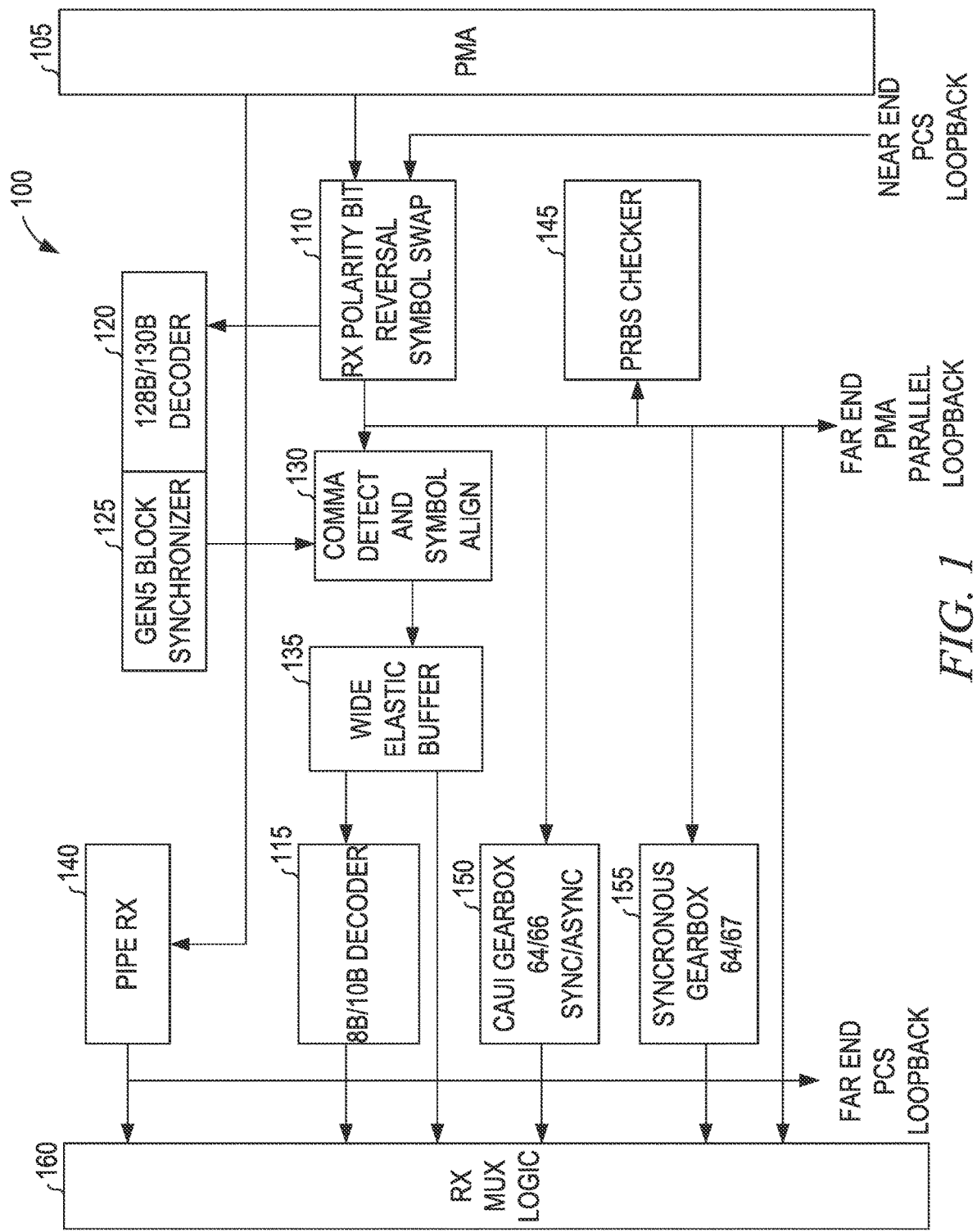
FIG. 1 is a high-level diagrammatic view of a system that interfaces with networks and includes a wide elastic buffer, according to some example embodiments.

FIG. 1 is a high-level diagrammatic view of a system 100 that interfaces with networks and includes a wide elastic buffer, according to some example embodiments. The system 100 includes a physical medium attachment (PMA) interface 105, a receive (RX) polarity bit reversal symbol swap circuit 110, an 8-bit/10-bit (8b/10b) decoder circuit 115, and 128-bit/130-bit (128b/130b) decoder circuit 120, a 5th generation (GEN5) block synchronizer circuit 125, a comma detection and symbol alignment circuit 130, a wide elastic buffer 135, a RX pipe circuit 140, a pseudo-random bit stream (PRBS) checker circuit 145, a chip attachment unit interface (CAUI) gearbox circuit 150, a synchronous gearbox circuit 155, and a RX multiplexer (MUX) logic 160, connected as shown by physical traces, buses, or other connection circuitry. For readability, various MUXes between the components 105-160 are not shown in FIG. 1.

The PMA interface 105 receives a data read request. The data read request and a near end physical coding sublayer (PCS) loopback input are provided to a MUX and one or the other is provided as input to the RX polarity bit reversal symbol swap circuit 110. The RX polarity bit reversal symbol swap circuit 110 is used to invert data, swap byte ordering, and reverse bit-ordering, as determined by three configuration lines: rev_bit, rev_pol, and swap_symbol. This allows the system 100 to communicate with other systems that use other physical configuration options to represent data. The output of the RX polarity bit reversal symbol swap circuit 110 is formatted in the way expected by the remainder of the system 100 and is directed to all of (or selectively to one of) the comma detection and symbol alignment circuit 130, the 128b/130b decoder 120, the CAUI gearbox circuit 150, the synchronous gearbox circuit 155, the RX MUX logic 160, the far end PMA parallel loopback, and the PRBS checker circuit 145. The PRBS checker circuit 145 may detect transmission errors by comparing received data generated pseudo-randomly by a transmitter with an identical PRBS generated locally.

The system 100 may implement a peripheral interconnect interface express (PCIe) device that supports $1^{st}$-$5^{th}$ generation (GEN1-GEN5) protocols. The 8b/10b decoder circuit 115 is used for GEN1 and GEN2 communications. The 128b/130b decoder 120 is used for GEN3-GEN5 communications. 8b/10b decoding converts 10 encoded bits to 8 decoded bits. 128b/130b decoding converts 130 encoded bits to 128 decoded bits. GEN5 processing further includes the GEN5 block synchronizer circuit 125.

PMA parallelization occurs at arbitrary word boundaries. Consequently, the parallel data from the RX PMA clock data recovery (CDR) must be realigned to meaningful character boundaries by the GEN5 block synchronizer circuit 125. The PCIe 4.0 base specification outlines that the data is formed using 130-bit blocks, with the exception of skip (or SK) blocks. The SK Ordered Set can be 66, 98, 130, 162, or 194 bits long. The block synchronizer searches for the Electrical Idle Exit Sequence Ordered Set (or the last number of fast training sequences (NFTS) Ordered Set) or skips (SKP) Ordered Set to identify the correct boundary for the incoming stream and to achieve the block alignment. The block is realigned to the new block boundary following the receipt of a SKP Ordered Set, as it can be of variable length.

A MUX selects, based on the communication protocol of the system 100, either the output of the RX polarity bit reversal symbol swap circuit 110 or the GEN5 block synchronizer circuit 125 to be provided as input to the comma detection and symbol alignment circuit 130. The comma detection and symbol alignment circuit 130 can be configured to support a variety of standards (e.g., PCIe GEN1 or GEN2) by programming various characters for detection and, in response to detection, alignment. Symbol alignment uses alignment and sequence characters for identifying the correct symbol boundary in the received data-stream. Attributes for alignment and sequence detect symbols are specified to be 10-bit wide. This block offers a very generic and programmable comma pattern with sequence options to fit any of the protocol scenarios and custom scenarios. A skip request is also referred to as a comma pattern, since the first character of a PCIe skip request is a comma (COM) symbol, followed by a number of SKPs.

The wide elastic buffer 135 is used to synchronize the received data from the PMA recovered clock to a system clock or local clock (typically transmit clock). The wide elastic buffer 135 comprises a plurality of first-in first-out (FIFO) columns and compensates for the frequency differential between the PMA recovered clock and the system or local clock by adding or deleting pre-configured Skip (or Pad or Align) characters from the received data stream. The elastic FIFO provides an indication that skip (or Pad or Align) characters were added or deleted to the downstream logic. For PCIe, the elastic FIFO also includes the appropriate status encoding to indicate whether the operation added or deleted characters.

As shown in the system 100, when data is received in an 8b/10b encoded format, the wide elastic buffer 135 stores the encoded 10b data. This allows the system 100 to operate as a loopback slave. PCIe requires that a loopback slave retransmits received 10-bit information exactly as received. Accordingly, by storing the 10b data and retransmitting it without decoding and re-encoding, operating as a loopback slave is supported. Since the 128b/130b data is decoded to 8-bit data before being stored in the wide elastic buffer 135, the wide elastic buffer 135 is capable of storing both 8-bit and 10-bit data.

The PCI Express 4.0 base specification defines that the SKP Ordered Set (OS) can be 66, 98, 130, 162, or 194 bits long. The SKP OS has the following fixed bits: 2-bit Sync, 8-bit SKP END, and a 24-bit LFSR=34 Bits. The wide elastic buffer 135 adds or deletes the 4 SKP characters (32 bits) to keep the FIFO from going empty or full, respectively. If the FIFO is nearly full, it deletes the 4 SKP characters by disabling write whenever a SKP is found. If the FIFO is nearly empty, the design waits for a SKP Ordered Set to start and then stops reading the data from the FIFO, and inserts a SKP in the outgoing data.

The CAUI gearbox circuit 150 and the synchronous gearbox circuit 155 adapt the PMA data width to the width of the PCS interface. The CAUI gearbox circuit 150 supports a 64-bit PMA interface width and a 66-bit PCS interface width. The synchronous gearbox circuit 155 supports a 64-bit PMA interface width and a 67-bit PCS interface width.

Both the CAUI gearbox circuit 150 and the synchronous gearbox circuit 155 support a synchronous mode. The gearbox will stall the data throughput by de-asserting a 'data_valid' signal for 1 clock cycle to match the ratios. The fabric handles the 'data_valid' signal. The CAUI gearbox circuit 150 may also support an asynchronous mode, in with the gearbox takes care of providing the data on each clock cycle of the receiver clock.

When gearboxing is not used, the output of the wide elastic buffer 135 is provided to the RX pipe circuit 140 or to the RX MUX logic 160. The RX pipe circuit 140 is used to support other communication modes, bypassing the wide elastic buffer 135 and other components of the system 100. A MUX controls the input to the RX MUX logic 160 to select from the output of the RX pipe circuit 140, the wide elastic buffer 135, the CAUI gearbox circuit 150, the 8b/10b decoder 115, and the synchronous gearbox circuit 155. The data provided to the RX MUX logic 160 is provided as the output of the system 100. Thus, the system 100 provides the PMA interface 105, handles the necessary data format conversions, buffers data, and provides the data on the RX MUX logic 160 in a regular manner, ready for processing by a device. Additionally, the output is sent to a far end PCS loopback.

Figure 2:
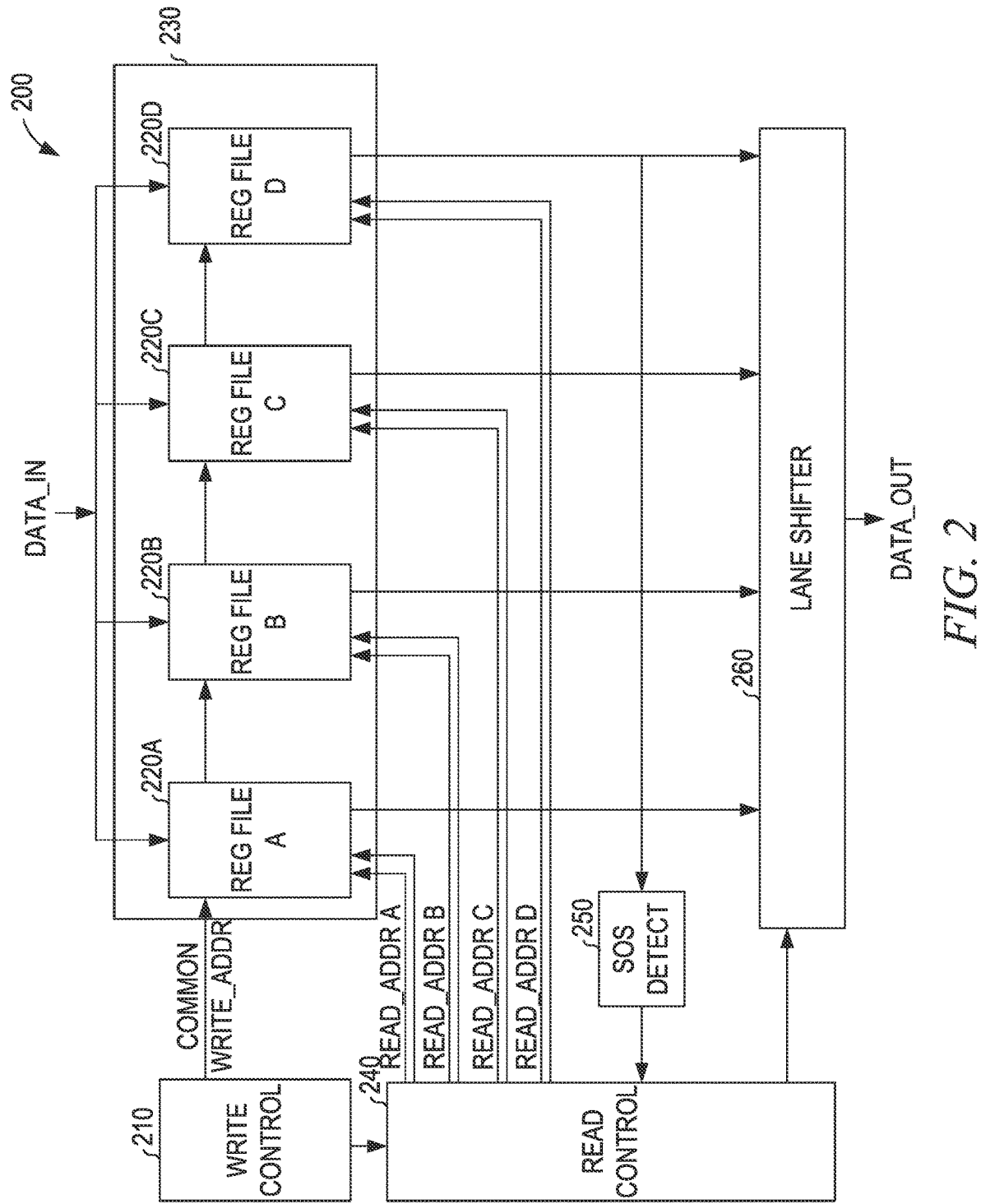
FIG. 2 is a high-level diagrammatic view of an implementation of a wide elastic buffer, according to some example embodiments.

FIG. 2 is a high-level diagrammatic view of an implementation of a wide elastic buffer 200, according to some example embodiments. The wide elastic buffer 200 includes a write controller 210; a data buffer circuit 230 comprising four register files 220A, 220B, 220C, and 220D; a read controller 240, a skip ordered set (SOS) detector 250, and a lane shifter 260. The register files 220A-220D may be referred to generically as "a register file 220."

Data is received on a DATA_IN signal and written to the common write address provided by the write controller 210.

As shown in FIG. 2, the common write address is the same for all of the register files 220A-220D. Additionally, the write controller 210 provides the common write address to the read controller 240. This allows the read controller 240 to always be aware of how full the data buffer circuit 230 is. The write controller 210 operates in the PMA recovered clock domain. The read controller 240, the SOS detector 250, and the lane shifter 260 operate on the internal clock domain. Each of the register files 220A-220D is a column in a four entry-wide buffer that allows the asynchronous transfer of data between the two clock domains.

The common write address is incremented by the size of the incoming data and may point to any of the register files 220A-220D. For example, if the incoming data is four entries wide, the common write address points to an address in the register file 220A. When data is written, an entry is written to each of the register files 220A-220D and the common write address is incremented by four (to point to the next address in the register file 220A). As another example, if the incoming data is one entry wide, the common write address points to an address in any one of the register files 220A-220D. When data is written, an entry is written only to the register file pointed to by the common write address and the common write address is incremented by one (to point to the next available entry in the next register file). Thus, using the common write address, incoming data of any size up to the number of register files can be handled.

To read data, the read controller 240 reads data from each of the register files 220A-220D using two read addresses. The eight read data entries are provided to the lane shifter 260. The lane shifter 260, based on the eight read data entries and a signal from the read controller 240, selects and rearranges the eight read data entries to generate a four-entry output, provided as a DATA_OUT signal. Though the example of FIG. 2 uses four register files and a four-entry output, other sizes are contemplated (e.g., eight register files and an eight-entry output). Additionally, each entry may be a byte, 10 bits, a word, a double-word, or another amount of data.

The SOS detector 250 checks the data read from the data buffer circuit 230 to determine if a skip data command is part of the data. For example, in PCIe GEN1-GEN2, an SOS comprises a COM symbol followed by one or more SKPs. If a skip data command is detected, the read controller 240 is informed and enabled to send an appropriate signal to the lane shifter 260. In PCIe GEN3-GEN5, an SOS compromises one or more groups of four SKPs followed by a SKIP END. Thus, when implemented in a PCIe GEN1 or GEN2 system, the SOS detector 250 may determine that a skip data command is received based on a COM symbol; in a PCIe GEN3, GEN4, or GEN5 system, a skip data command may be detected based on a SKP symbol; in other systems, other symbols or sequences may be used to detect skip data commands.

The lane shifter circuit 260 reads one or more elements from the data buffer circuit 230 and provides them as DATA_OUT. After data is read from the data buffer circuit from the data buffer circuit 230, the lane shifter circuit 260 updates a pointer for each register file 220. Typically, one entry is read from each register file 220 and each pointer is incremented by one.

If the SOS detector 250 detects that a decoded symbol is a skip request, the read controller 240 determines how many symbols are to be skipped for the skip request. The number of symbols to be skipped may be the same as the number of symbols of the skip request or more or fewer symbols. The number of symbols to be skipped may be based on the fill level of the data buffer circuit 230. For example, if the data buffer circuit 230 is more than half full, fewer symbols may be skipped, helping to empty the data buffer. As another example, if the data buffer circuit 230 is less than half full, more symbols may be skipped, retaining data in the data buffer. The fill level of the register files 220A-220D may be determined by taking a difference between the common write address and one of the read addresses (e.g., the read address for the register file 220A) and comparing the difference to the size of the register file.

In response to the skip request, the lane shifter circuit 260 modifies the pointer for a first one of the register files 220A-220D by a different amount than the pointer for a second one of the register files 220A-220D. The non-identical pointer modification allows multiple entries to be read from one register file 220 while only one entry is read from another register file 220 or allows one entry to be read from one register file 220 without reading any entries from another register file 220.

Allowing different numbers of entries to be read from each register file 220 allows the skip data request to be processed with a granularity smaller than an entire row of the data buffer circuit 230. As a result, skip requests from protocols that support a maximum number of skips that is fewer than the number of columns of the data buffer circuit 230 can be accommodated while still making full use of the data buffer circuit 230. By comparison with other solutions that disable columns of the data buffer circuit 230 so that the (enabled) width of the data buffer is no greater than the maximum entries that can be skipped, the system 100 is enabled to run at a lower clock rate, have a larger buffer, or both. Additionally, a width-limited data buffer would have limited ability to handle a protocol that transfers more data per clock cycle. For example, if a protocol that transmits four entries per clock is being used and the data buffer is one entry wide, the logic that transfers the four entries into the data buffer must execute at a four-times faster clock, to allow four writes to complete before the next set of four entries is received. Using the solution described herein, both the narrow (e.g., one entry per clock) and wide (e.g., four entries per clock) protocols can be handled efficiently by the same hardware.

Though the examples described herein are with reference to PCIe, the wide elastic buffer may be used in other systems and for other protocols. For example, universal serial bus (USB) or serial advanced technology attachment (SATA) protocols may use the wide elastic buffer.

FIG. 3 is an example 300 showing register file contents 310, lane shifter output 320, and read pointer modifications 330 for a wide elastic buffer. The register file contents 310 shows eight rows of data in each of four register files. The letters A-X are used to indicate data, COM indicates the beginning of a skip data request, and SK is a received skip entry. A number in parentheses indicates that the data entry is a first data entry in an output of the lane shifter output 320.

The register file contents 310 contains eight four-entry communications, sixteen two-entry communications, or thirty-two one-entry communications, with the first-received communication at the bottom-right and the last-received communication at the top-left. If the receiving device and the transmitting device are perfectly synchronized, the lane shifter output 320 would match the register file contents 310 and each right-most entry in the register file contents 310 would contain parentheses. However, in the example of FIG. 3, the receiving device is operating slightly slower than the transmitting device. Accordingly, some of the received skip entries will be ignored, allowing the receiving device to catch up by processing additional data entries.

The lane shifter output 320 shows the seven data outputs made with the eight rows of data in the register file contents 310. Each two-entry COM/SK pattern in the register file contents 310 results in a one-entry COM pattern in the lane shifter output 320, reducing the number of data entries to skip. Despite the modification of the data in the register file contents 310, the order of the data in the lane shifter output 320 is unchanged.

The read pointer modifications 330 show the change to the read pointer of the corresponding column in the register file contents 310 after filling a row of the lane shifter output 320. Thus, for the first row of the lane shifter output 320, the data values D, C, B, and A were read, one from each column of the register file contents 310 and, as shown in the first row of the read pointer modifications 330, the read pointer for each column was incremented by one.

For the second output row, the read pointers for each column pointed to the data values F, E, SK, and COM. The next read pointers for each column pointed to the data values SK, COM, H, and G. Because the lane shifter has access to all eight data values, it is able to remove the first SK (before the E), shift the E and F, and place the G from the next row into the proper place. Thus, the second output row is generated. One entry was consumed from each of the first three columns, so the read pointers for that column are incremented. Two entries (COM and G) were consumed from the fourth column, the read pointers for that column are increased by two, as shown in the second row of the read pointer modifications 330.

As a result of the read pointers not being modified by the same amount, during preparation of the third output row, data will be read from different input rows for different columns. Thus, the data available to the lane shifter is SK and COM for the first column, COM and K for the second column, H and J for the third column, and I and SK for the fourth column. Furthermore, the last column from which data was read is stored, so the lane shifter knows that the first entry for the third output row is not the fourth column but the third. Accordingly, the lane shifter is able to determine that the data, sequentially, is H, COM, SK, I, J, K, COM. Removing the SK and outputting four entries yields the H, COM, I, J shown in row three of the lane shifter output 320. In this case, two entries were taken from the third column and, as shown in row three of the read pointer modifications 330, the pointer for the third column is increased by two.

FIG. 4 is an example 400 showing register file contents 410, lane shifter output 420, and read pointer modifications 430 for a wide elastic buffer. The register file contents 410 shows the same data values as the register file contents 310, but the positions of a number in parentheses indicates that the data entry is a first data entry in an output of the lane shifter output 420 and the positions are different than in FIG. 3. In the example of FIG. 4, the receiving device is operating slightly faster than the transmitting device. Accordingly, some skip entries will be added, allowing the receiving device to slow down by processing fewer data entries.

The lane shifter output 420 shows the nine data outputs made with the eight rows of data in the register file contents 410. Each two-entry COM/SK pattern in the register file contents 410 results in a three-entry COM/SK/SK pattern in the lane shifter output 420. Despite the modification of the data in the register file contents 410, the order of the data in the lane shifter output 420 is unchanged.

The read pointer modifications 430 show the change to the read pointer of the corresponding column in the register file contents 410 after filling a row of the lane shifter output 420. Thus, for the first row of the lane shifter output 420, the data values D, C, B, and A were read, one from each column of the register file contents 410 and, as shown in the first row of the read pointer modifications 430, the read pointer for each column was incremented by one.

For the second output row, the read pointers for each column pointed to the data values F, E, SK, and COM. The next read pointers for each column pointed to the data values SK, COM, H, and G. Because the lane shifter has access to all eight data values, it is able to insert an SK before the E. This increases the number of data entries to skip and shifts the E to the next position. Thus, the second output row is generated. One entry was consumed from each of the last three columns, so the read pointers for those columns are incremented. No entries were consumed from the first column, so the read pointers for that column are not increased (or alternatively, are increased by zero), as shown in the second row of the read pointer modifications 430.

As a result of the read pointers not being modified by the same amount, during preparation of the third output row, data will be read from different input rows for different columns. Thus, the data available to the lane shifter is F and SK for the first column, COM and K for the second column, H and J for the third column, and G and I for the fourth column. Furthermore, the last column from which data was read is stored, so the lane shifter knows that the first entry for the third output row is not the fourth column but the first. Accordingly, the lane shifter is able to determine that the data, sequentially, is F, G, H, COM, SK, I, J, K, COM. No SKs are added or removed in the first positions, so the output four entries are F, G, H, COM shown in row three of the lane shifter output 420. In this case, one entry was taken from each column of the register file contents 410 and, as shown in row three of the read pointer modifications 430, each pointer is incremented by one.

Though the examples of FIGS. 2-4 show four columns being used in the wide elastic buffer, other widths are contemplated. For example, the wide elastic buffer could be eight columns, twelve columns, sixteen columns, or thirty-two columns wide. Greater widths to support higher transfer rates are also possible.

Figure 5:
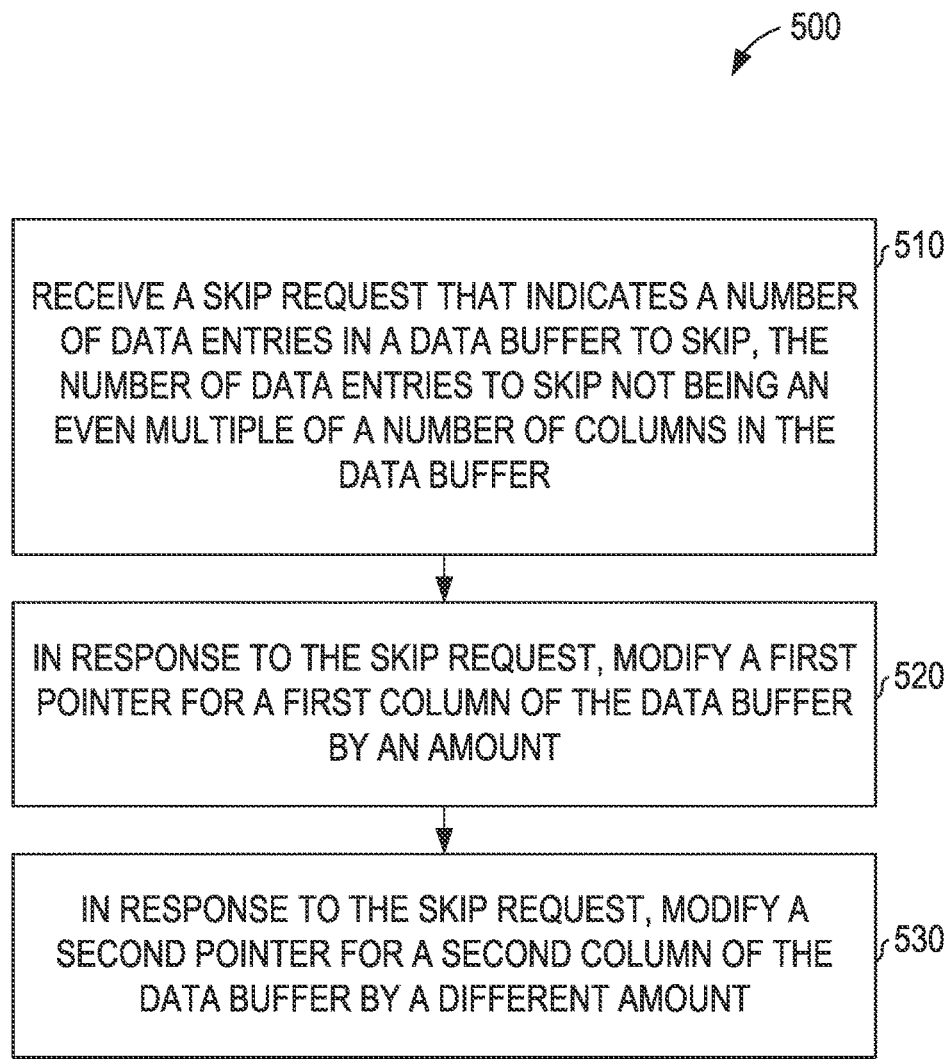
FIG. 5 is a flowchart of a method maintaining pointers in a wide elastic buffer, according to some example embodiments.

FIG. 5 is a flowchart of a method 500 of maintaining pointers in a wide elastic buffer, according to some example embodiments. The method 500 includes the operations 510, 520, and 530. By way of example and not limitation, the method 500 is described as being performed by components of the system 100 of FIG. 1 and the wide elastic buffer 200 of FIG. 2, with reference to the example data of FIGS. 3-4.

In operation 510, the read controller 240 is notified by the SOS detector 250 that a skip request has been received that indicates a number of data entries in a data buffer to skip, the number of entries to skip not being an even multiple of a number of columns in the data buffer. For example, the COM, SK sequence of FIGS. 4-5 is a request to skip two data entries, which is not an even multiple of the number of columns (four) in the data buffer (e.g., the data buffer formed by the four register files 220A-220D in FIG. 2).

The read controller 240, in operation 520, in response to the skip request, modifies a first pointer for a first column of the data buffer by an amount. Also in response to the skip request, the read controller 240, in operation 530, modifies a second pointer for a second column of the data buffer by a different amount. For example, each of the second, third, fourth, and sixth rows of the read pointer modifications 430 shows a pointer for one column being increased by two while the pointers for the other three columns are increased by one. As another example, each of the second, fourth, fifth, and eighth rows of the read pointer modifications 430 shows a pointer for one column being left unchanged while the pointers for the other three columns are increased by one.

In response to instructions received from the read controller 240, the lane shifter 350 selects among the eight data values read from the register files 320A-320D and a ninth SK value for each of the four output lanes of DATA_OUT. Thus, under control of the read controller 240, the lane shifter 350 outputs the correct four entries to support the addition or subtraction of SK values to the DATA_IN. By modifying the read pointers, the read controller 240 maintains the state necessary for ensuring that the modification of the output does not result in reordered, lost, or duplicated data.

Figure 6:
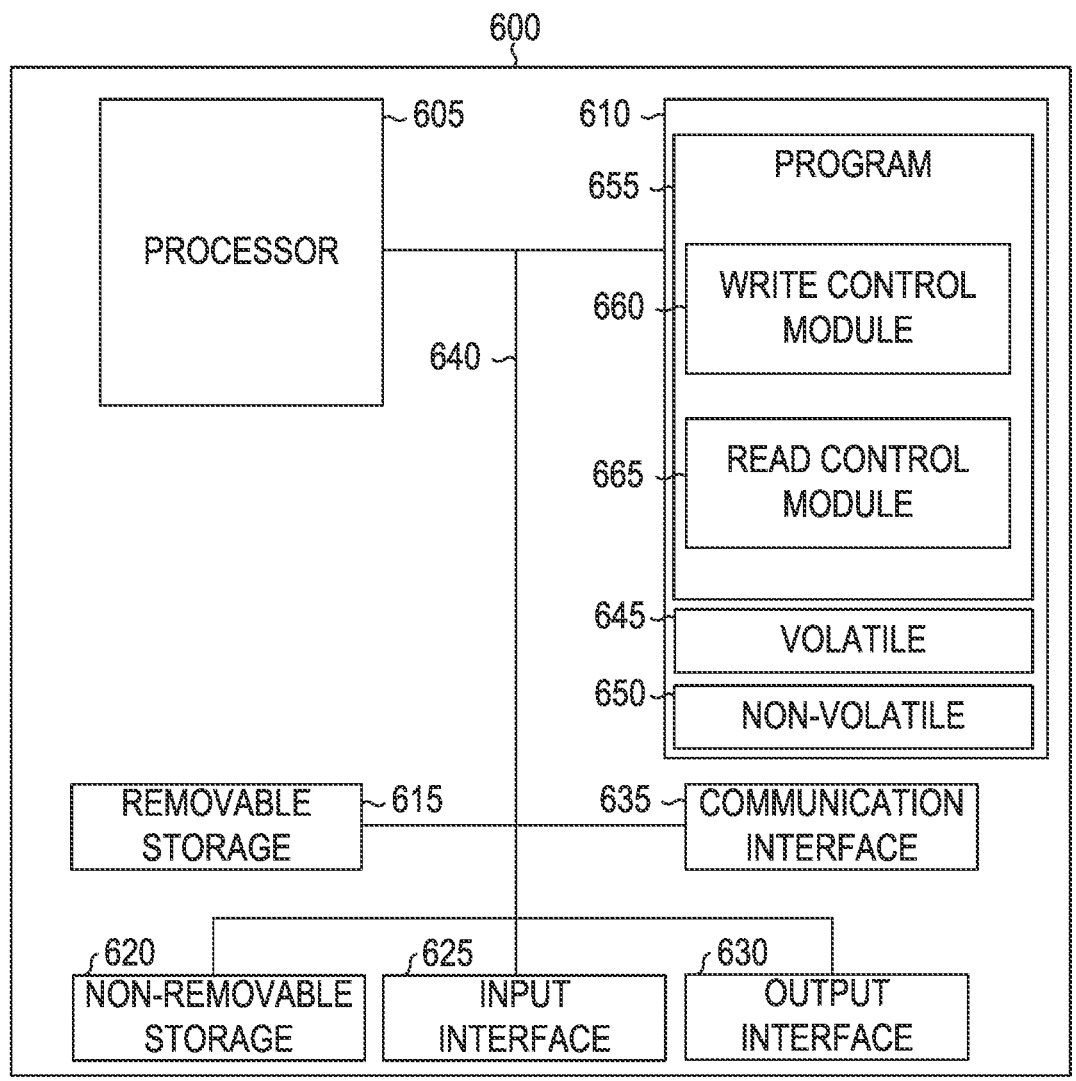
FIG. 6 is a block diagram illustrating components of a system for performing the methods described herein, according to some example embodiments.

FIG. 6 is a block diagram illustrating components of a system 600 for performing the methods described herein, according to some example embodiments. All components need not be used in various embodiments. For example, clients, servers, autonomous systems, and cloud-based network resources may each use a different set of components, or, in the case of servers, for example, larger storage devices.

One example computing device in the form of a computer 600 (also referred to as computing device 600 and computer system 600) may include a processor 605, memory storage 610, removable storage 615, and non-removable storage 620, all connected by a bus 640. Although the example computing device is illustrated and described as the computer 600, the computing device may be in different forms in different embodiments. For example, the computing device may instead be a smartphone, a tablet, a smartwatch, or another computing device including elements the same as or similar to those illustrated and described with regard to FIG. 6. Devices such as smartphones, tablets, and smartwatches are collectively referred to as "mobile devices." Further, although the various data storage elements are illustrated as part of the computer 600, the storage may also or alternatively include cloud-based storage accessible via a network, such as the Internet, or server-based storage.

The memory storage 610 may include volatile memory 645 and non-volatile memory 650 and may store a program 655. The computer 600 may include, or have access to, a computing environment that includes a variety of computer-readable media, such as the volatile memory 645; the non-volatile memory 650; the removable storage 615; and the non-removable storage 620. Computer storage includes random-access memory (RAM), read-only memory (ROM), erasable programmable read-only memory (EPROM) and electrically erasable programmable read-only memory (EEPROM), flash memory or other memory technologies, compact disc read-only memory (CD ROM), digital versatile disks (DVD) or other optical disk storage, magnetic cassettes, magnetic tape, magnetic disk storage or other magnetic storage devices, or any other medium capable of storing computer-readable instructions.

The computer 600 may include or have access to a computing environment that includes an input interface 625, an output interface 630, and a communication interface 635. The output interface 630 may interface to or include a display device, such as a touchscreen, that also may serve as an input device. The input interface 625 may interface to or include one or more of a touchscreen, a touchpad, a mouse, a keyboard, a camera, one or more device-specific buttons, one or more sensors integrated within or coupled via wired or wireless data connections to the computer 600, and other input devices. The computer 600 may operate in a networked environment using the communication interface 635 to connect to one or more remote computers, such as database servers. The remote computer may include a personal computer (PC), server, router, network PC, peer device or other common network node, or the like. The communication interface 635 may connect to a local-area network (LAN), a wide-area network (WAN), a cellular network, a WiFi network, a Bluetooth network, or other networks.

Computer instructions stored on a computer-readable medium (e.g., the program 655 stored in the memory storage 610) are executable by the processor 605 of the computer 600. A hard drive, CD-ROM, and RAM are some examples of articles including a non-transitory computer-readable medium such as a storage device. The terms "computer-readable medium" and "storage device" do not include carrier waves to the extent that carrier waves are deemed too transitory. "Computer-readable non-transitory media" includes all types of computer-readable media, including magnetic storage media, optical storage media, flash media, and solid-state storage media. It should be understood that software can be installed in and sold with a computer. Alternatively, the software can be obtained and loaded into the computer, including obtaining the software through a physical medium or distribution system, including, for example, from a server owned by the software creator or from a server not owned but used by the software creator. The software can be stored on a server for distribution over the Internet, for example.

The program 655 is shown as including a write control module 660 and a read control module 665. Any one or more of the modules described herein may be implemented using hardware (e.g., a processor of a machine, an ASIC, an FPGA, or any suitable combination thereof). Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

The write control module 660 maintains a common write pointer for multiple register files for writing received data into a buffer for clock domain crossing.

The read control module 665 maintains two read pointers for each of multiple register files for reading buffered data and modifying the read data to create output data that compensates for frequency differences between the external clock domain and the internal clock domain.

The Abstract of the Disclosure is provided to comply with 37 C.F.R. § 1.72 (b), requiring an abstract that allows the reader to quickly ascertain the nature of the technical disclosure. It is submitted with the understanding that it will not be used to interpret or limit the claims. In addition, in the foregoing Detailed Description, it may be seen that various features are grouped together in a single embodiment for the purpose of streamlining the disclosure. This method of disclosure is not to be interpreted as limiting the claims. Thus, the following claims are hereby incorporated into the Detailed Description, with each claim standing on its own as a separate embodiment.

What is claimed is:
1. A system comprising:
a data buffer circuit that is configured to buffer data in a data buffer that comprises a plurality of columns; and
a lane shifter circuit coupled to the data buffer circuit and configured to perform operations comprising:

accessing a plurality of data elements comprising two data elements from each column of the plurality of columns; and based on detecting a skip ordered set in the accessed plurality of data elements, the skip ordered set comprising fewer symbols than a number of columns in the plurality of columns, generating an output that comprises a number of output data elements equal to the number of columns, two of the output data elements having been accessed from a single column of the plurality of columns.

2. The system of claim 1, further comprising:
a write controller that operates in a first clock domain and is configured to write data to the data buffer circuit;
wherein the lane shifter circuit operates in a second clock domain different from the first clock domain.

3. The system of claim 2, wherein the write controller utilizes a single write pointer that can point to any column in the data buffer.

4. The system of claim 1, wherein:
the accessing of the plurality of data elements comprising two data elements from each column of the plurality of columns comprises using two read addresses for said column; and
each column of the plurality of columns comprises more than two rows.

5. The system of claim 1, wherein the operations further comprise determining that the accessed plurality of data elements include a skip request.

6. The system of claim 5, wherein:
the skip request comprises a first number of symbols; and
the output comprises a sequence of symbols that skips a second number of symbols that is different than the first number of symbols.

7. The system of claim 6, wherein the operations further comprise:
based on a determination that the data buffer is less than half full, the lane shifter circuit sets the second number to a value that is larger than the first number.

8. A method comprising:
buffering data by a data buffer circuit that comprises a plurality of columns;
accessing, by a lane shifter circuit, a plurality of data elements comprising two data elements from each column of the plurality of columns; and
based on detecting a skip ordered set in the accessed plurality of data elements, the skip ordered set comprising fewer symbols than a number of columns in the plurality of columns, generating, by the lane shifter circuit, an output that comprises a number of output data elements equal to a number of columns of the plurality of columns, two of the output data elements having been accessed from a single column of the plurality of columns.

9. The method of claim 8, further comprising:
writing data to the data buffer circuit by a write controller that operates in a first clock domain;
wherein the lane shifter circuit operates in a second clock domain different from the first clock domain.

10. The method of claim 9, wherein the write controller utilizes a single write pointer that can point to any column in the data buffer circuit.

11. The method of claim 8, wherein:
the accessing of the plurality of data elements comprising two data elements from each column of the plurality of columns comprises using two read addresses for said column; and
each column of the plurality of columns comprises more than two rows.

12. The method of claim 8, further comprising:
determining that the accessed plurality of data elements include a skip request.

13. The method of claim 12, wherein:
the skip request comprises a first number of symbols; and
the output comprises a sequence of symbols that skips a second number of symbols that is different than the first number of symbols.

14. The method of claim 13, further comprising:
based on a determination that the data buffer circuit is less than half full, the lane shifter circuit sets the second number to a value that is larger than the first number.

15. A non-transitory machine-readable medium that stores instructions that, when executed by one or more processors, cause the one or more processors to perform operations comprising:
buffering data by a data buffer circuit that comprises a plurality of columns;
accessing, by a lane shifter circuit, two data elements from each column of the plurality of columns; and
based on detecting a skip ordered set in the accessed data elements, the skip ordered set comprising fewer symbols than a number of columns of the plurality of columns, generating, by the lane shifter circuit an output that comprises a number of output data elements equal to the number of columns, two of the output data elements having been accessed from a single column of the plurality of columns.

16. The non-transitory machine-readable medium of claim 15, wherein the operations further comprise:
writing data to the data buffer circuit by a write controller that operates in a first clock domain;
wherein the lane shifter circuit operates in a second clock domain different from the first clock domain.

17. The non-transitory machine-readable medium of claim 16, wherein
the write controller utilizes a single write pointer that can point to any column in the data buffer circuit.

18. The non-transitory machine-readable medium of claim 15, wherein:
the accessing of the two data elements from each column of the plurality of columns comprises using two read addresses for said column; and
each column of the plurality of columns comprises more than two rows.

19. The non-transitory machine-readable medium of claim 15, wherein the operations further comprise:
determining that the accessed data elements include a skip request.

20. The non-transitory machine-readable medium of claim 19, wherein:
the skip request comprises a first number of symbols; and
the output comprises a sequence of symbols that skips a second number of symbols that is different than the first number of symbols.

* * * * *